US009995961B1

(12) United States Patent
Bai et al.

(10) Patent No.: US 9,995,961 B1
(45) Date of Patent: Jun. 12, 2018

(54) DISPLAY APPARATUS WITH REFLECTIVE STRUCTURE

(71) Applicants: Lu Bai, Lake Oswego, OR (US); Ming Yu, Beaverton, OR (US); Roger E. Yaffe, Wilsonville, OR (US)

(72) Inventors: Lu Bai, Lake Oswego, OR (US); Ming Yu, Beaverton, OR (US); Roger E. Yaffe, Wilsonville, OR (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 44 days.

(21) Appl. No.: 13/766,527

(22) Filed: Feb. 13, 2013

(51) Int. Cl.
G02F 1/1335 (2006.01)
(52) U.S. Cl.
CPC .............. G02F 1/133603 (2013.01)
(58) Field of Classification Search
CPC ............ G09G 3/34; G09G 3/3406; G09G 2320/0233; G09G 3/2025; G09G 2340/06; G09G 2300/0456; G09G 2300/0452; G02F 1/133615; G02F 1/133308; G02F 1/133553; G02F 2201/34; G02F 1/133602–1/133611; G02F 2001/133607; G02F 2001/133616; G02F 2201/086; G02B 6/0031; G02B 6/0055; G02B 19/0066; G02B 5/0284; G02B 3/08; G02B 5/0242; G02B 5/0278; G02B 5/22; F21Y 2101/02; F21Y 2103/003; F21Y 2105/001; Y10S 362/80; Y10S 385/901; Y10S 345/905; F21V 13/02; F21V 13/04
USPC ............................................ 362/97.1–97.2
See application file for complete search history.

(56) References Cited

U.S. PATENT DOCUMENTS

| 2002/0097354 | A1* | 7/2002 | Greiner ........................ 349/61 |
| 2004/0080938 | A1* | 4/2004 | Holman et al. ............... 362/231 |
| 2005/0276069 | A1* | 12/2005 | Taniguchi et al. ............ 362/600 |
| 2006/0007553 | A1* | 1/2006 | Bogner ............. G02F 1/133603 359/630 |
| 2006/0091784 | A1* | 5/2006 | Conner et al. ................ 313/498 |
| 2006/0092643 | A1* | 5/2006 | Wong ..................... F21V 5/048 362/308 |
| 2006/0203146 | A1* | 9/2006 | Bang ................. G02F 1/133603 349/69 |
| 2006/0215075 | A1* | 9/2006 | Huang et al. ................... 349/67 |
| 2007/0147075 | A1* | 6/2007 | Bang ............................ 362/609 |

(Continued)

FOREIGN PATENT DOCUMENTS

| WO | WO 2012029600 A1 * | 8/2012 | |
| WO | WO 2012102163 A1 * | 8/2012 | ....... G02F 1/133606 |

Primary Examiner — Temesghen Ghebretinsae
Assistant Examiner — Ivelisse Martinez Quiles
(74) Attorney, Agent, or Firm — Donna P. Suchy; Daniel M. Barbieri

(57) ABSTRACT

A display apparatus is provided. The display apparatus includes a light source. The display apparatus includes a display target configured to receive light from the light source. The display target displays an image using at least a portion of the light received from the light source. The display apparatus includes a first reflective structure configured to reduce an outgoing angle of at least a portion of the light from the light source. The display apparatus includes a second reflective structure configured to longitudinally translate at least a portion of the light from at least one of the light source and the first reflective structure toward the display target.

20 Claims, 10 Drawing Sheets

(56) References Cited

U.S. PATENT DOCUMENTS

| | | | |
|---|---|---|---|
| 2007/0152230 A1* | 7/2007 | Duong | H01L 33/58 257/98 |
| 2007/0223248 A1* | 9/2007 | Han | 362/612 |
| 2008/0002100 A1* | 1/2008 | Kaneko et al. | 349/65 |
| 2008/0002403 A1* | 1/2008 | Kim | G02F 1/133603 362/240 |
| 2008/0186273 A1* | 8/2008 | Krijn et al. | 345/102 |
| 2008/0291668 A1* | 11/2008 | Aylward et al. | 362/225 |
| 2009/0118406 A1* | 5/2009 | Tomoda | C08L 69/00 524/284 |
| 2009/0268434 A1* | 10/2009 | Mita | G02F 1/133603 362/97.1 |
| 2010/0027241 A1* | 2/2010 | Nakanishi | G02F 1/133605 362/97.1 |
| 2010/0027257 A1* | 2/2010 | Boonekamp et al. | 362/235 |
| 2010/0061087 A1* | 3/2010 | Stevens et al. | 362/97.3 |
| 2010/0079980 A1* | 4/2010 | Sakai | 362/97.1 |
| 2010/0165472 A1* | 7/2010 | Hamasaki | B32B 27/32 359/627 |
| 2010/0165621 A1* | 7/2010 | Hoffend et al. | 362/235 |
| 2010/0290247 A1* | 11/2010 | Im | G02B 6/0091 362/606 |
| 2011/0037740 A1* | 2/2011 | Yamaguchi | 345/204 |
| 2012/0092854 A1* | 4/2012 | Fang | G02B 6/0068 362/97.1 |
| 2012/0140446 A1* | 6/2012 | Seetzen | G02F 1/133605 362/97.1 |
| 2012/0212689 A1* | 8/2012 | Chang | G02F 1/133605 349/64 |
| 2012/0224111 A1* | 9/2012 | Ohshima | 348/790 |
| 2013/0100648 A1* | 4/2013 | Nozawa | 362/97.2 |
| 2013/0128128 A1* | 5/2013 | Ikuta | 348/790 |
| 2013/0148036 A1* | 6/2013 | Shimizu | 348/739 |
| 2013/0301241 A1* | 11/2013 | Maeda | G02F 1/133606 362/97.1 |

* cited by examiner

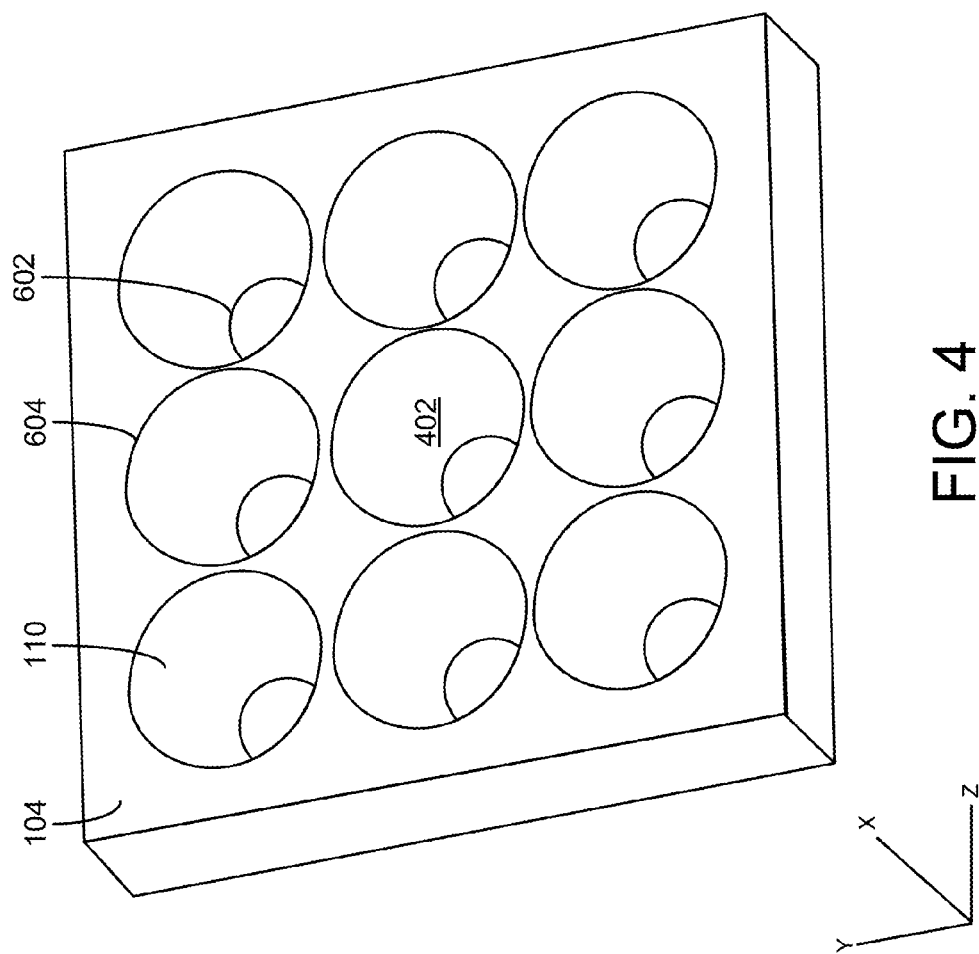

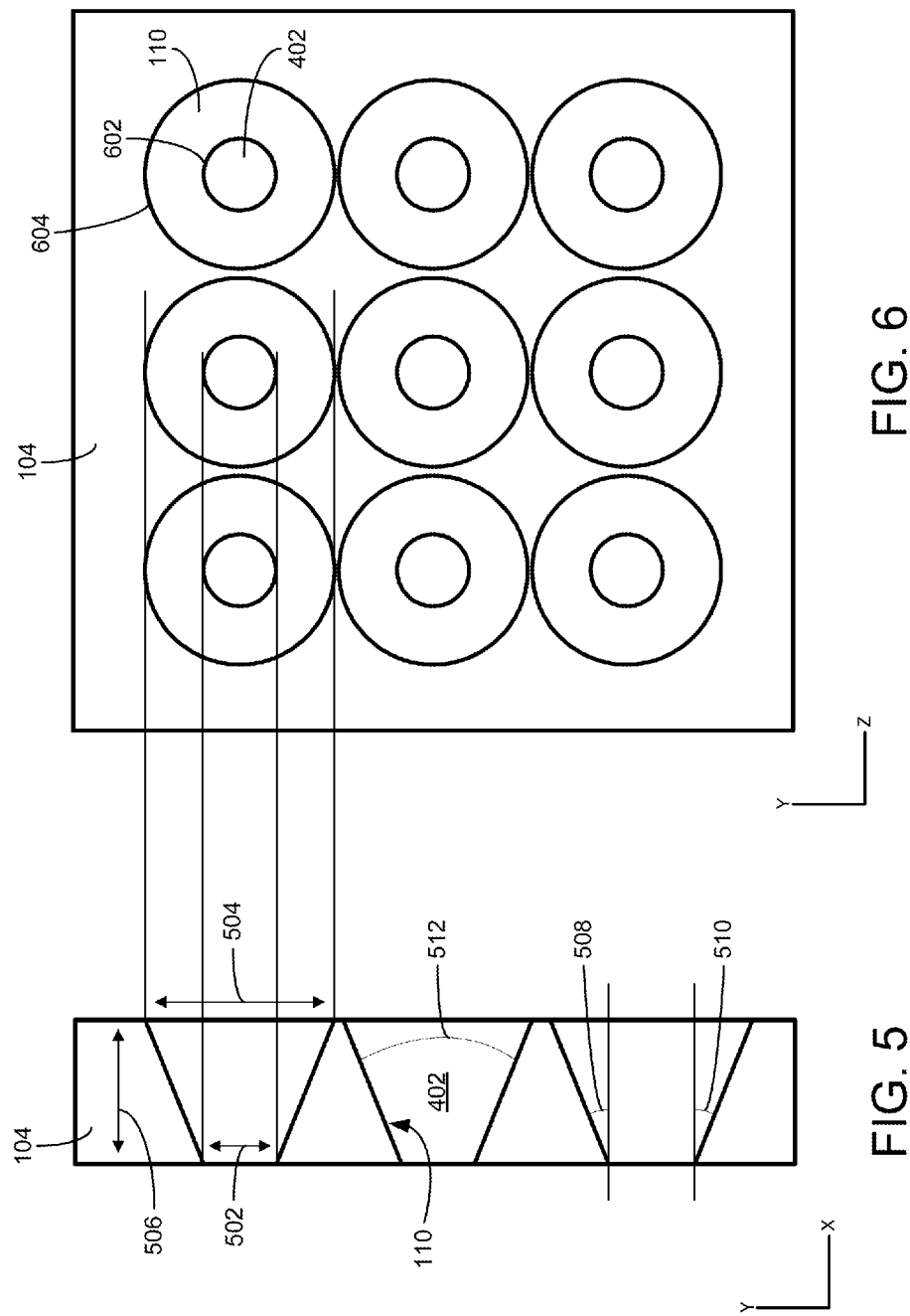

DISPLAY APPARATUS WITH REFLECTIVE STRUCTURE

BACKGROUND OF THE INVENTION

The present invention relates generally to the field of display systems. More particularly, the application describes one or more reflective structures for use with a display's backlight system.

A light emitting diode (LED) array can be used in conjunction with a liquid crystal display (LCD) to display images. Depending on the voltage applied to the LCD pixel, variable amounts of the light generated by the LED may be transmitted through the LCD pixel. The light passing through the LCD forms an image observable by a viewer.

In many cases, the LCD requires input light to be within a certain angle of incidence. It also requires good uniformity in both angular and spatial distribution of the light at its input facet. The light that comes out of an LED array has a large angular distribution and will normally need be controlled on its way to the LCD in order to meet such demands. And such backlight control should not cause too much loss of light. A poorly designed control may result in a less-than-desirable spatial/angular uniformity (e.g., the spatial/angular distribution of the incidence of light rays along the LCD) and illumination efficiency (e.g., the output luminance on the LCD per the power provided by the LED array). One way to increase luminance is to increase the driving power of the LED array. However, this may result in the generation of excessive heat in the display system. Also, this does not result in an efficiency improvement because extra power is required to generate the extra luminance. Also, increasing the driving power does not necessarily improve the spatial uniformity and angular distribution.

Therefore, there is a need for a display's backlight system that results in improving illumination efficiency, spatial uniformity, and angular distribution.

It would be desirable to provide a system and/or method that provides one or more of these or other advantageous features. Other features and advantages will be made apparent from the present specification. The teachings disclosed extend to those embodiments that fall within the scope of the appended claims, regardless of whether they accomplish one or more of the aforementioned needs.

SUMMARY OF THE INVENTION

One embodiment of the invention relates to a display apparatus. The display apparatus includes a light source. The display apparatus includes a display target configured to receive light from the light source. The display target displays an image using at least a portion of the light received from the light source. The display apparatus includes a first reflective structure configured to reduce an outgoing angle of at least a portion of the light from the light source. The display apparatus includes a second reflective structure configured to longitudinally translate at least a portion of the light from at least one of the light source and the first reflective structure toward the display target.

Another embodiment of the invention relates to a method for displaying an image. The method includes providing light rays from a light emitting diode (LED) array. The array may include an m×n matrix of LED lamps. The method includes providing a liquid crystal display (LCD) configured to transmit a majority of the light rays from the LED array. The portion of light rays transmitted is representative of an image displayed by the LCD. The method includes providing a plurality of first reflective surfaces disposed between the LED array and the LCD, and adjacent to the LED array. The plurality of first reflective surfaces reduces an outgoing angle of at least a portion of the light rays originating from the LED array. The method includes providing a plurality of second reflective surfaces disposed between the plurality of first reflective surfaces and the LCD. The plurality of second reflective surfaces longitudinally translates at least a portion of the light rays from at least one of the LED array and the plurality of first reflective surfaces toward the LCD.

Another embodiment of the invention relates to a display system. The display system includes multiple light emitting diode (LED) arrays. The LED arrays emit light rays. The LED arrays comprise an m×n matrix of LED lamps. The display system includes a liquid crystal display (LCD) configured to transmit a majority of the light rays from the LED arrays. The portion of light rays transmitted is representative of an image displayed by the LCD. The display system includes a plurality of first reflective surfaces disposed between the LED arrays and the LCD, and adjacent to the LED arrays. The plurality of first reflective surfaces reduce an outgoing angle of at least a portion of the light rays originating from the LED arrays. The display system includes a plurality of second reflective surfaces disposed between the plurality of first reflective surfaces and the LCD. The plurality of second reflective surfaces longitudinally translate at least a portion of the light rays from at least one of (a) the LED arrays and (b) the plurality of first reflective surfaces toward the LCD.

BRIEF DESCRIPTION OF THE DRAWINGS

The invention will become more fully understood from the following detailed description, taken in conjunction with the accompanying drawings, wherein like reference numerals refer to like elements, in which:

FIGS. 4-6 are illustrations of a first reflective structure, according to exemplary embodiments;

DETAILED DESCRIPTION OF THE PREFERRED EMBODIMENTS

A display apparatus may include a light source and a display target. In one or more embodiments of the present disclosure, a display apparatus having one or more reflective structures is provided. The reflective structures may be disposed between the light source (e.g., LED array) and the display target (e.g., LCD). According to an exemplary embodiment, a first reflective structure is advantageously used in combination with a second reflective structure. The reflective structures may reorient light rays originating from the light source. One or more reflective structures may advantageously modify (e.g., decrease) the outgoing angle of the light rays such that a greater proportion of the rays reach the display target and provide more desired spatial/angular uniformity. The use of one or more reflective structures may advantageously increase illumination efficiency of the display system. One or more reflective structures may advantageously translate the light rays across a longitudinal space between the light source and the display target. The illumination efficiency may be increased while advantageously not increasing the driving power of the light source and the heat generated by the light source. A reduction of light source driving power and heat may advantageously enable greater flexibility in construction of the display system through, e.g., the inclusion of electrical and/or mechanical components (e.g., wires, connectors, etc.) that are less tolerant of heat, a reduction in apparatus package size because a large heat sink is no longer needed to remove high heat, etc. One or more embodiments of the present disclosure may be advantageously utilized with a display target with a small pixel size. One or more embodiments may be advantageously utilized with a display target that is less suited to receiving light with relatively high incident angles.

Figure 1:
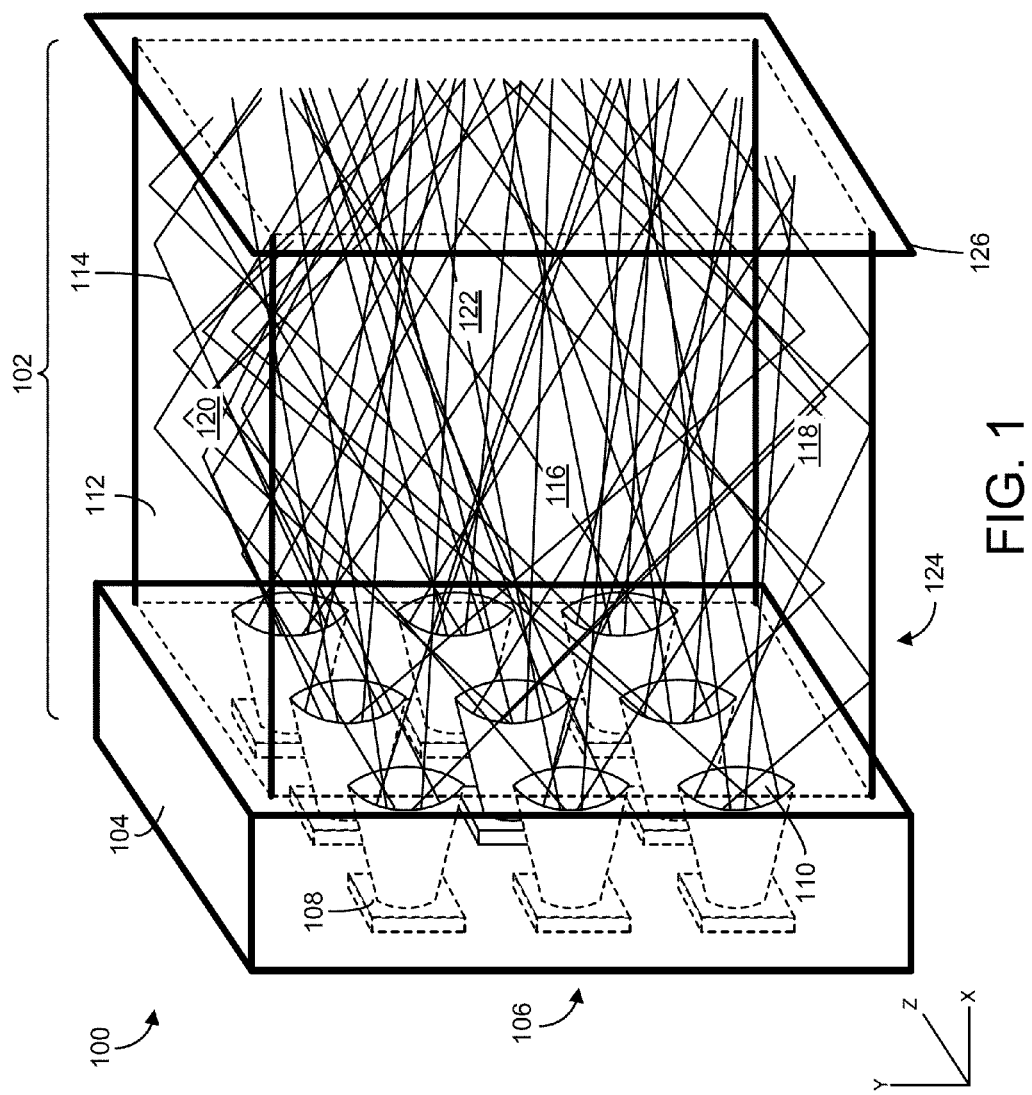
FIGS. 1-2 are illustrations of a display apparatus, according to exemplary embodiments.
Figure 3B:
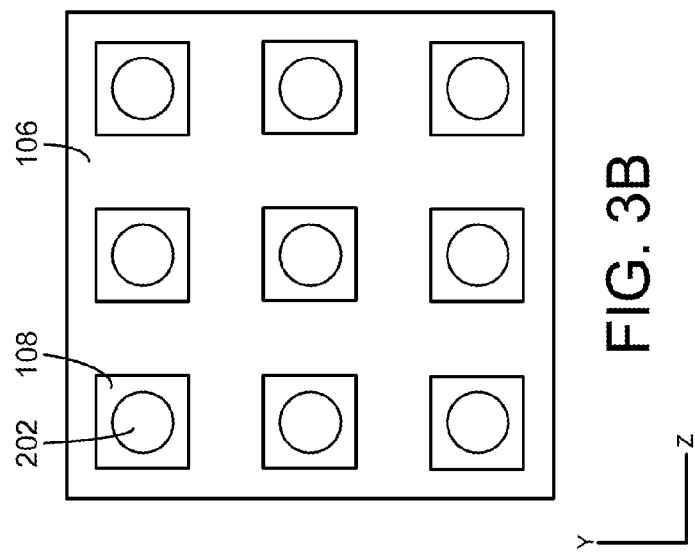
FIGS. 3A-3B are illustrations of an LED array, according to exemplary embodiments.
Figure 3A:
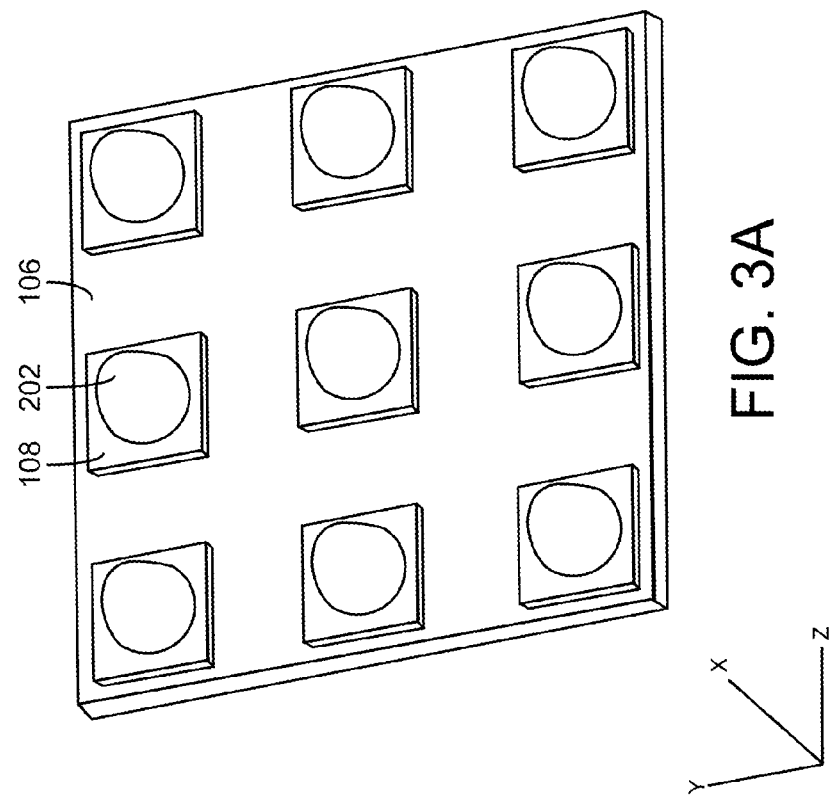

Referring to FIG. 1, an illustration of a display apparatus 100 is shown, according to an exemplary embodiment. Display apparatus 100 includes a light source 106. Light source 106 may be disposed at a proximal end of display apparatus 100. In the embodiment of FIG. 1, light source 106 is an LED array with individual LEDs (e.g., arranged in an m×n matrix). This embodiment of light source 106 is shown in more detail in FIGS. 3A and 3B. The individual LEDs in array 106 include base 108 and bulb 202. Bulb 202 may be mounted to array 106 via base 108. Base 108 may include electronics hardware to control bulb 202's emission of light. Bulb 202 emits light when the bulb is on. A display system may include multiple light sources 106 arranged adjacent to each other (e.g., rows and columns of LED arrays). The multiple light sources 106 may span an extent (e.g., a horizontal and vertical extent) of the corresponding display target 126 (FIG. 1). Light source 106 may or may not be parallel to display target 126. Display apparatus 100 may include electrical and/or mechanical components (not shown) for controlling the light generated by light source 106.

Display apparatus 106 (FIG. 1) includes a display target 126. In the embodiment of FIG. 1, display target 126 is a portion of an LCD. According to an exemplary embodiment, display target 126 is an active matrix LCD (AMLCD). Display apparatus 100 may include electrical and/or mechanical components (not shown) for controlling passage, blocking, or partial blocking of light by the display target 126 (e.g., controlling the orientation of liquid crystals in the LCD based on application of a current). An image is generated on LCD 126 based on the transmission of light originating from LED array 106 through LCD 126.

The embodiment of FIG. 1 shows a backlit LED display system. In other embodiments, various other display systems may be utilized with the one or more reflective structures. For example, light source 106 may be any source of electromagnetic radiation. Light source 106 may be an array with individual elements (in various arrangements, e.g., 3×4, 4×4, etc.) or may be a single light source. Light source 106 may be disposed in different positions relative to display target 126 (e.g., edge-lit). Display target 126 may be a passive matrix LCD or may be any display structure configured to generate an image based on the transmission of light through and/or incidence of light on the structure.

Space 102 is shown to exist between light source 106 and display target 126. The size of space 102 may vary in different embodiments. Light emitted by light source 106 traverses space 102 prior to reaching display target 126. According to an exemplary embodiment, space 102 includes first reflective structure 104 and second reflective structure 124. In other embodiments, one or more than two reflective structures may be disposed in space 102 between light source 106 and display target 126. First reflective structure 104 may have interior reflective surfaces 110. While only surface 110 is specifically referenced in FIG. 1, the discussion herein of surface 110 applies to all, or substantially all, of the interior surfaces of first reflective structure 104. Second reflective structure 124 may have interior reflective surfaces 116, 118, 120, 122. Light ray 114 is an example of light ray originating from light source 106. Light ray 114 may be reflected off an interior surface of one, the other, or both of structures 104, 124 before reaching display target 126. Display apparatus 100 may also include a diffuser (not shown) for distributing light from light source 106 evenly before the light reaches display target 126.

Reflective structures 104, 124 may include interior surfaces 110, 116, 118, 120, 122 that are made of, covered by, and/or otherwise include a material having the properties required for the material to reflect light and/or other electromagnetic radiation. For example, a film with reflective properties (e.g., mirror film) may be adhered to the interior surface of structures 104, 124. For example, a coating (e.g., aluminum) may be applied to the interior surface of structures 104, 124. In some embodiments, structures 104, 124 may be made of a same substance as the interior surface of the structures. For example, structures 104, 124 may be made of aluminum, and the interior surface may be aluminum. In some embodiments, the interior surfaces may be finished or otherwise processed in a manner that other surfaces of structures 104, 124 are not. For example, the interior surfaces of an aluminum structure may be polished. In some embodiments, structures 104, 124 may be made of a different substance than the interior reflective surface. For example, structures 104, 124 may be at least partially plastic, and the interior surface may have an aluminum coating applied to it. While aluminum is specifically mentioned in this discussion, other metals or any other substances with reflective properties may be utilized for structures 104, 124 and/or the interior surfaces of structures 104, 124. A material that maximizes reflectivity (e.g., as close to 100% reflectivity as possible) may be selected. For example, a mirror film with 98% reflectivity may be used. According to an exemplary embodiment, a material with greater than 50% reflectivity. According to another exemplary embodiment, a material at least 70% reflectivity is chosen. According to another exemplary embodiment, a material that balances uniformity when applied to the surface (e.g., how straight and/or regular is the surface after the material has been applied) and reflectivity is selected. In some embodiments, the material for interior surfaces 110, 116, 118, 120, 122 is chosen such that certain wavelengths of light are reflected, while others are not. While some interior surfaces are specifically discussed, other surfaces (e.g., non-interior surfaces) of first reflective structure 104, second reflective structure 124, and/or display apparatus 100 may have reflective properties.

One embodiment of first reflective structure 104 is shown in FIGS. 1-2 and 4-6. According to an exemplary embodiment, first reflective structure 104 is a plate or slab of material including multiple recesses 402 (FIG. 4). In some embodiments, first reflective structure may be material from which a portion is removed (e.g., during a machining process) to create recesses 402. In other embodiments, first reflective structure may be molded (e.g., injection-molded plastic) with recesses 402. While these two specific ways of manufacturing structure 104 are mentioned, any process, mechanism, and/or material for manufacturing structure 104 may be used.

Figure 2:
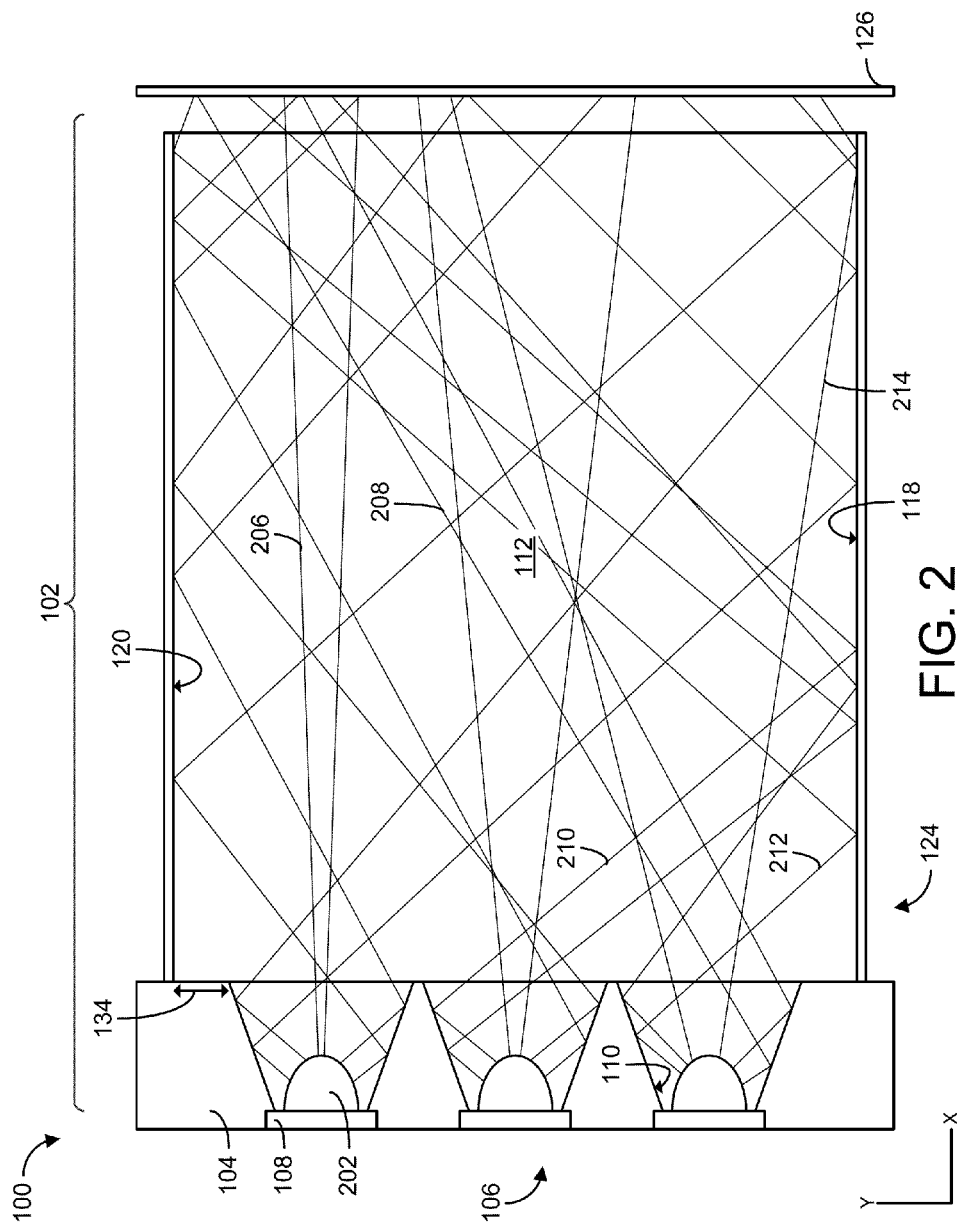

According to an exemplary embodiment, first reflective structure 104 may be disposed adjacent to light source 106, in an intermediate position relative to light source 106 and display target 126 (FIGS. 1-2). For example, structure 104 may be placed over LED array 106 such that each lamp 202 fits into each recess 402 of structure 104 (FIG. 2). As shown in the embodiment of FIG. 2, at least a portion of the light rays originating from lamp 202 are reflected off of surface 110 of structure 104 because of the placement of structure 104 relative to LED array 106. Bases 108 of light source 106 and the contours of recesses 402 are shown in dashed lines in FIG. 1. First reflective structure 104 may be attached or otherwise coupled to light source 106 and/or second reflective structure 124 as required (e.g., through mechanical components). First reflective structure 104 may advantageously avoid wire bounding and customization involved in placing LED components into a conical structure. Structure 104 may be advantageously implemented with off-the-shelf LEDs.

Referring to FIGS. 4-6, illustrations of first reflective structure 104 are shown, according to exemplary embodiments. FIG. 4 is three-dimensional representation of structure 104. FIG. 5 is a two-dimensional view of structure 104 along the x-y plane. In FIG. 5, structure 104 is oriented such that a light source would be disposed to the left of structure 104 and the display target would be disposed to the right of structure 104. FIG. 6 is a two-dimensional view of structure 104 along the z-y plane. In FIG. 6, structure 104 is oriented as if an observer were viewing structure 104 while facing a display apparatus 100 (FIG. 1) from the side including display target 126. First reflective structure 104 is shown to include a plurality of recesses 402. When structure 104 is fitted over, e.g., a LED array, LED lamps 202 may occupy at least portions of recesses 402 (FIG. 2). According to an exemplary embodiment, recess 402 includes a first perimeter 602 at a proximal end of structure 104 (an end closer to the light source 106) and a second perimeter 604 at a distal end of structure 104 (an end closer to the second reflective structure 124 and display target 126). In some embodiments, second perimeter 604 is larger than first perimeter 602. In such embodiments, the shape of recess 402 may be at least partially conical (FIG. 5). Structure 104 may be described as a cone reflector or cone reflector array with this conical shape. Interior surfaces 110 may be sloped (FIG. 5). Interior surfaces 110 may be straight in some embodiments and curved in other embodiments. While perimeters 602, 604 and the cross-section of recesses 402 are shown to be circular in FIGS. 1, 4, and 6, in other embodiments, the perimeters and/or cross-sections may be a variety of shapes. For example, recess 402 may be partially or entirely conical, or partially or entirely conic (e.g., circular, elliptical, parabolic, etc.). In some embodiments, a polynomial may describe the partial or entire shape of recess 402. In some embodiments, the shape of recess 402 may be cylindrical combined with another shape (e.g., conical, conic, polynomial-based, etc.). The shapes discussed are exemplary only, and recess 402 may be other shapes. The shapes of interior surfaces 110, perimeters 602, 604, and/or cross-section of recesses 402 may be chosen to optimize the angular distribution, maximize the illumination efficiency of the display system, and result in a more uniform spatial distribution of the incidence of lights rays on display target 126. The distance between recesses 402 in structure 104 may be chosen, e.g., depending on the placement of LED lamps. For example, recesses 402 may be spaced farther apart when the LED lamps are spaced farther apart and vice versa.

The dimensions of various features of first reflective structure 104 may be chosen to maximize the illumination efficiency and/or optimize the spatial/angular uniformity of display apparatus 100. Structure 104 may have height 506. In some embodiments, height 506 may vary between 3 mm and 6 mm. Recess 402 may describe a space between perimeter 602 and perimeter 604. Perimeter 602 may have diameter 502, and perimeter 604 may have diameter 504. In some embodiments, the radius of perimeter 602 may be chosen such that an LED lamp may fit into recess 402 via perimeter 602. In some embodiments, the radius of perimeter 602 is approximately 1.5 mm. In some embodiments, the radius of perimeter 604 may vary between 3 mm and 3.5 mm. An interior surface 110 may be formed by the portion of structure 104 between perimeters 602, 604. Surface 110 may form angle 512. In some embodiments, angle 512 may vary between 28.1° and 61.9°. Angles 508, 510 may be described as half-angles (e.g., either angle 508 or angle 510 is half of cone angle 512). In some embodiments, angle 512 may be a particular value for one recess of structure 104 and a different value for another recess of structure 104. A larger cone angle 512 may result in a greater reduction of the outgoing angles of light from light source 106. Greater reduction of outgoing angles of light may advantageously increase the illumination efficiency. For example, when light with smaller angles is incident on the LCD, the photo scatter effect inside of the LCD may be reduced. This may result in increased LCD output contrast. For a display apparatus with a given internal size, larger cone angles may be accommodated by decreasing the height 506 of structure 104 and vice versa. With a relatively small height 506, some percentage rays with large angle from light source may miss structure 104. Thus, angle 512 and height 506 may be selected to balance the percentage of light that is reflected, so that overall light angles on LCD are controlled.

One embodiment of the second reflective structure 124 is shown in FIGS. 1-2. Structure 124 may be an enclosure at least partially surrounding a longitudinal cavity 112. Structure 124 may be described as a mirror tunnel because the interior surfaces 116, 118, 120, 122 are reflective. The enclosure may be formed by the walls with reflective structures 116-120. A proximal end of the enclosure (an end closer to light source 106 and first reflective structure 104) and a distal end of the enclosure (an end closer to display target 126) may be open. Reflection of a light ray off of an interior surface of structure 124 may translate the light ray through cavity 112. The longitudinal length of the second reflective structure 124 (along the x-axis) may vary in different embodiments and may be chosen to optimize the performance of the display system.

Figure 10A:
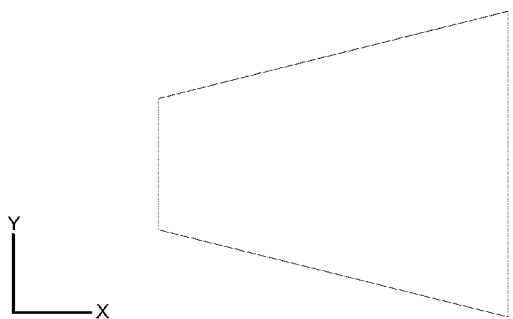
FIGS. 10A-10C are illustrations of shapes of a second reflective structure, according to exemplary embodiments.
Figure 10B:
Figure 10C:
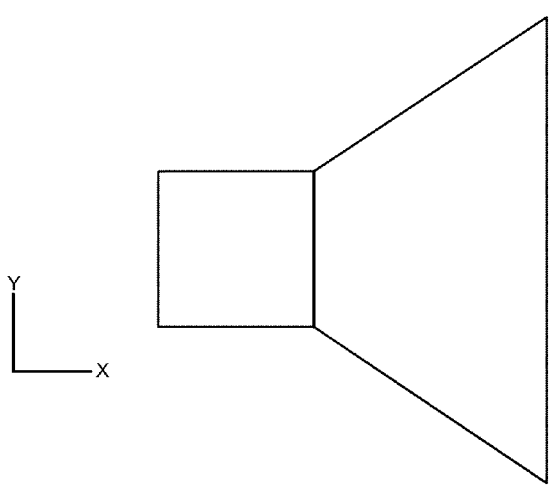
Figure 11:
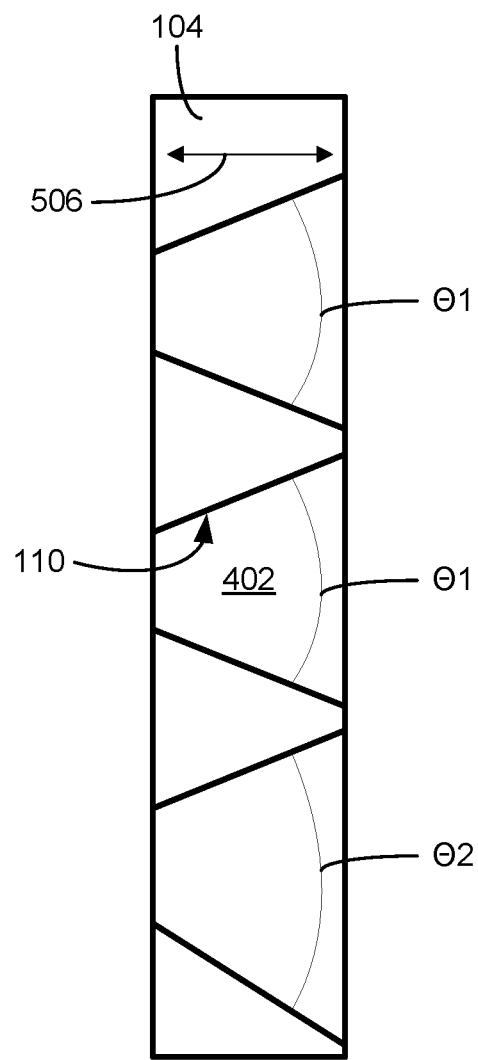
FIG. 11 is an illustration of a first reflective structure, according to an exemplary embodiment.

In the embodiment of FIG. 1, the cross-section of second reflective structure 124 is at least partially rectangular (e.g., slices of the y-z plane at various points along the x-axis). Also in the embodiment of FIG. 1, the cross-section (y-z view) of the second reflective structure 124 is shown to be uniform across its longitudinal length (i.e., same cross-section (y-z view) at the proximal end and the distal end). In other embodiments, the shape of the cross-section may be different (e.g., cylindrical, etc.). The cross-section may also be non-uniform (e.g., increasing or decreasing in cross-sectional area across its longitudinal length). For example, second reflective structure 124 may be the shapes shown in FIGS. 10A-10C. FIGS. 1-2 and 10A-10C are exemplary only, and second reflective structure 124 may be other shapes. In various embodiments, the cross-sectional area may be larger or smaller than that shown in FIG. 1, depending on, e.g., the size of the display system. The cross-sectional shape, area, uniformity/non-uniformity, and other features may be chosen to maximize illumination efficiency, optimize angular distribution, and/or optimize spatial uniformity of the display system. Changes in cross-sectional area of second reflective structure 124 may affect the spatial uniformity of the incidence of light rays on display target 126. In some embodiments, the cross-sectional area and/or longitudinal length of the second reflective structure 124, and the cone angle 512 of the first reflective structure 104 may be balanced to increase the efficacy of structures 104, 124. The second reflective structure 124 with a longitudinally tapered shape (as shown in FIGS. 10A and 10C), will firstly bridge the selected light source size and LCD size, and secondly further reduce the light angle which reach and are reflected from the tapered mirror surface. The second reflective structure 124 with shape of FIG. 10B will work for some mechanical structure constraints, such as when the LCD surface cannot be parallel to light source surface.

In some embodiments, the longitudinal length and the cross-sectional area of second reflective structure 124 may be constrained (e.g., by the size and/or position of light source 106, display target 126, the space between light source 106 and display target 126, and/or display apparatus 100). In such embodiments, height 506, diameters 502, 504, and/or angle 512 of the first reflective structure 104 may be chosen to optimize the angular distribution and spatial uniformity of incident light on the LCD within the system constraints. In other embodiments, the longitudinal length and cross-sectional area of second reflective structure 124 may be chosen. In such embodiments, a larger longitudinal length and larger cross-sectional area may be selected such that there is sufficient space for a first reflective structure with larger height 506 and larger angle 512. This may advantageously result in greater angular and spatial uniformity of incident light along display target 126.

Light rays may originate from light source 106 at a particular outgoing angle. Light rays 206-214 with various outgoing angles are shown in FIG. 2, according to an exemplary embodiment. The outgoing angle of a light ray may be described as the difference in the angle of the light ray compared to an imaginary horizontal line extending from the light source 106 to the display target 126. Light ray 206 may have a relatively small outgoing angle and traverse space 102 between light source 106 and display target 126 without contacting either first reflective structure 104 or second reflective structure 124. Light ray 208 may have a greater outgoing angle compared to light ray 206 and traverse space 102 after reflecting off of first reflective structure 104. Light ray 208 may be reflected off an interior surface 110 of first reflective structure 104. According to an exemplary embodiment, first reflective structure 104 collimates incident light coming from the LED. The outgoing angle of the light rays that hit the interior surface 110 may be reduced by the angle of the cone 512 (FIG. 5). That is, reflection off of the first reflective structure may advantageously reduce the outgoing angle of light ray 208 by the cone angle of the interior surface 110. Light ray 210 may have a greater outgoing angle compared to light ray 206. Light ray 210 may be reflected off of first reflective structure 104. Light ray 210 may also be reflected off of interior surface 118 of second reflective structure 124. Second reflective structure 124 may advantageously translate light ray 210 through space 102 toward display target 126. Light ray 212 may also have a greater outgoing angle compared to light ray 206. In some embodiments, a light ray may reflect off of first reflective structure 104 and/or second reflective structure 124 multiple times (e.g., light ray 212 reflects off of both interior surface 118 and interior surface 120 of second reflective structure 124). This may occur depending on the outgoing angle of the light ray. For example, a light ray with a higher outgoing angle is more likely to be reflected by first reflective structure 104 and second reflective structure 124, and by structures 104, 124 more than once. This may also occur depending on the position of the light source relative to the interior surfaces of structures 104, 124. For example, a light ray originating from an LED lamp 202 disposed at the top of the LED array 106 is closer to interior surface 120 of second reflective structure 124. This may increase the likelihood that the light ray reflects off of multiple interior surfaces (e.g., surfaces 120, 118).

According to an exemplary embodiment, a straight cone or curved cone reflector array (e.g., first reflective structure 104) mounted on an LED array (e.g., light source 106) in combination with a mirror tunnel (e.g., second reflective structure 124), whose input side includes an LED array, can manage the light rays that illuminate an LCD (e.g., display target 126) such that, e.g., the light rays have desirable angles and angular uniformity that satisfy the illumination input requirements of the LCD. This may advantageously improve illumination efficiency. An increase in illumination efficiency may advantageously enable a reduction in the driving power for the LEDs and a reduction in the heat caused by driving the LEDs. Designs around the LEDs may also be improved because of reduced heat in the display system.

Figure 7:
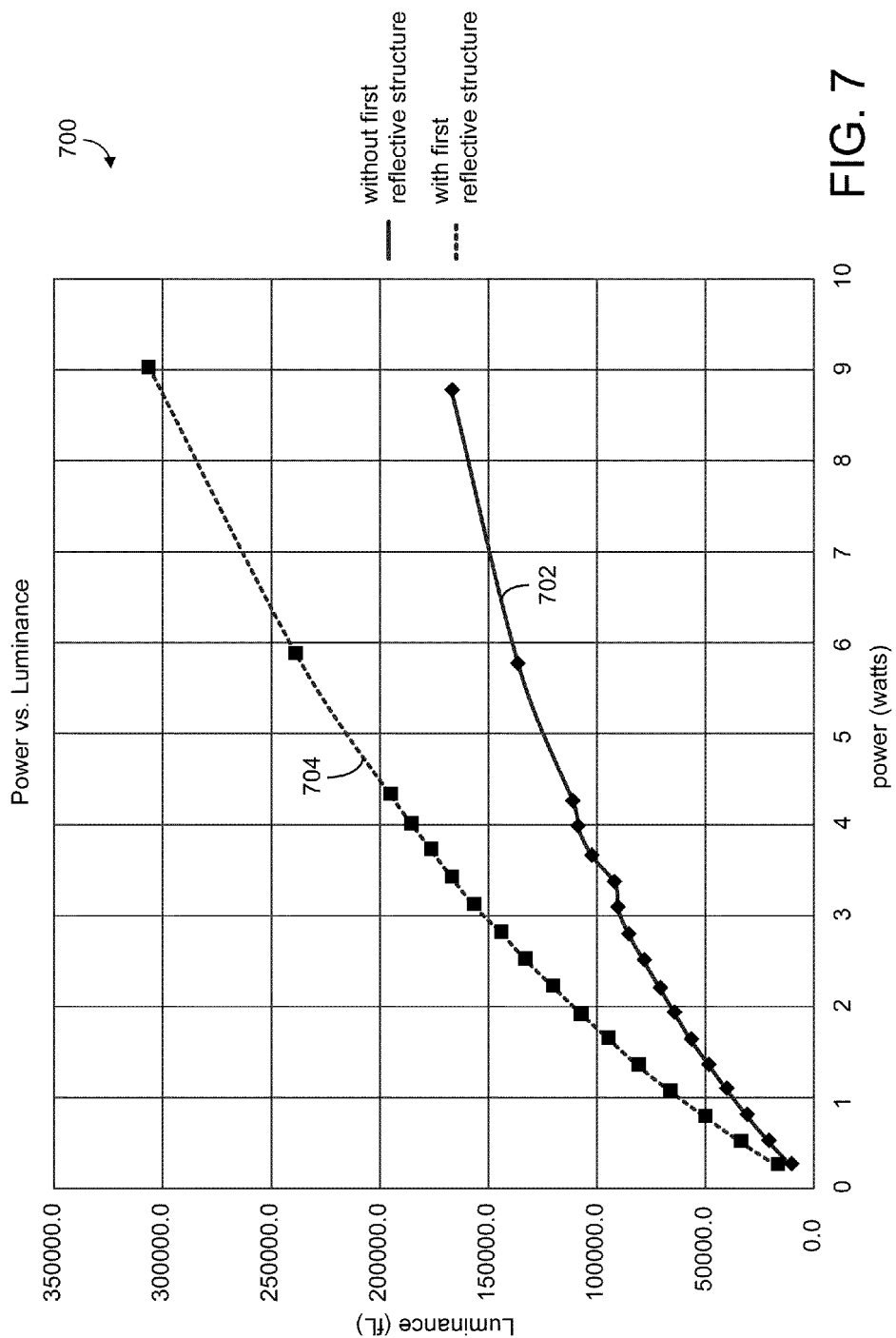
FIG. 7 is a plot of luminance as a function of power driving a light source, according to an exemplary embodiment.

Referring to FIG. 7, plot 700 of luminance as a function of power driving a light source is shown, according to an exemplary embodiment. The x-axis shows the driving power (in units of watts) for light source 106 of display apparatus 100. The y-axis shows the luminance (in units of foot-lamberts) of display target 126 of display apparatus 100. Plot 700 shows results from a lab test for luminance measured at a circular diffuser in display apparatus 100 at varying power. Power may be increased or decreased depending on an increased or decreased luminance requirement (e.g., of display target 126), respectively. The display apparatus 100 generating the results of plot 700 includes a 3×3 LED array. Display apparatus 100 includes second reflective structure 124. Curve 702 shows luminance as a function of power without first reflective structure 104. Curve 704 shows luminance as a function of power with first reflective structure 104. The first reflective structure used to generate plot 700 has height 506 equal to 4.5 mm and includes conical recesses with cone angles 512 equal to 44.7°. The parameters of display apparatus 100 discussed with respect to FIG. 7 are exemplary, and other embodiments may different values. Comparison of curve 702 and curve 704 shows that illumination efficiency (luminance per unit power) is substantially improved as the luminance requirement (i.e., power) increases when first reflective structure 104 and second reflective structure 124 are implemented in combination in display apparatus 100. Thus, the LED arrays may be driven at a reduced power, while maintaining the same or similar brightness at the LCD. The design of display apparatus 100 can benefit because there is greater flexibility in choosing mechanical and/or electrical components when less heat is generated by driving LEDs with less power. For example, designs may advantageously utilize a greater range of components (including components that are less tolerant of heat), and the apparatus package size may be reduced because no large heat sink is needed to dispatch high heat.

Figure 8:
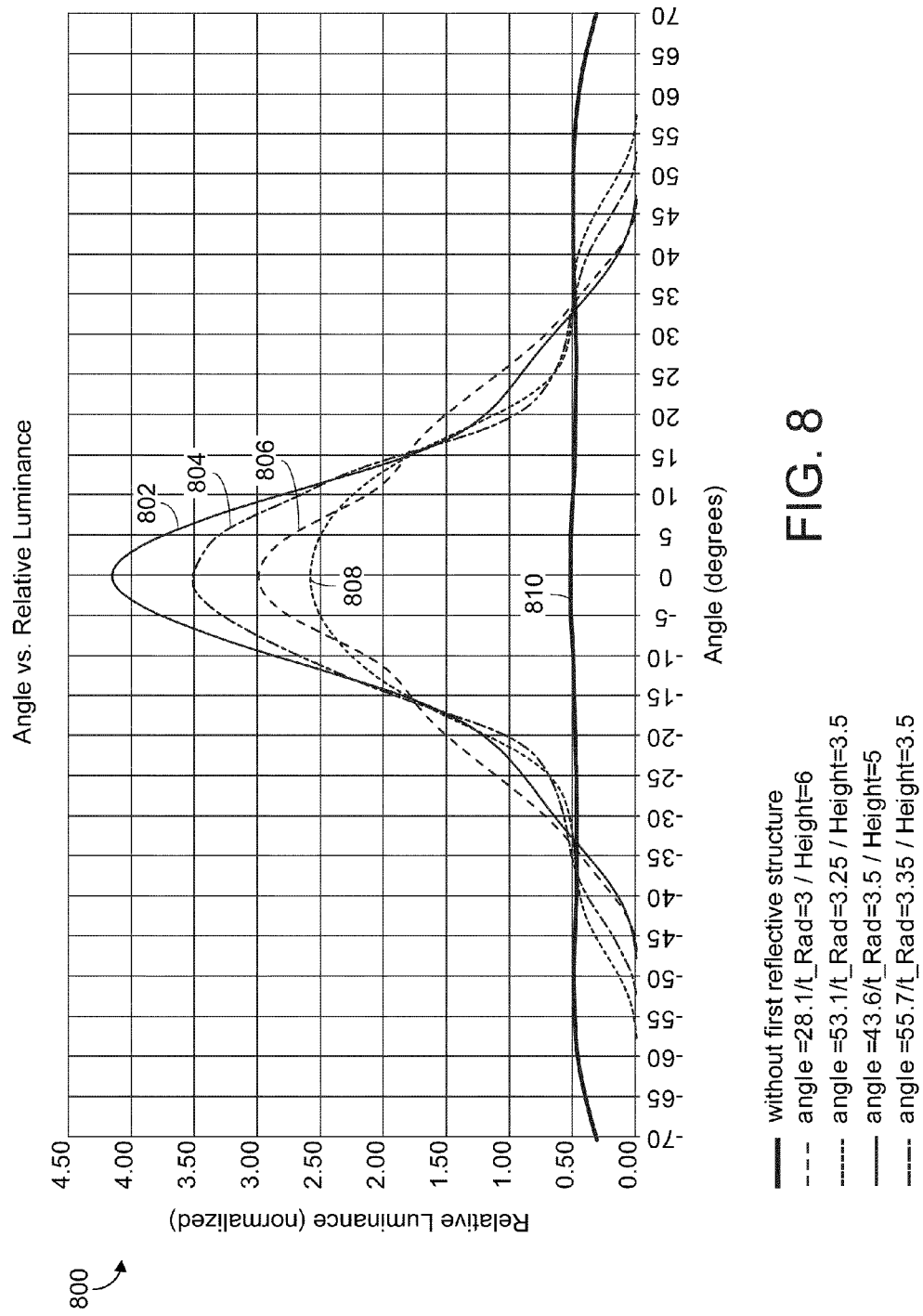
FIG. 8 is a plot of relative luminance as a function of angle at a measurement location, according to an exemplary embodiment.

Referring to FIG. 8, plot 800 of relative luminance as a function of angle at a measurement location is shown, according to an exemplary embodiment. Plot 800 shows results from a computer simulation for the relative luminance angular distribution at display target 126, away from light source 106. The x-axis of plot 800 shows the incident angle (in units of degrees) measured at display target 126, viewing from light source 106. The y-axis shows the relative luminance (in normalized units) of display target 126. Display apparatus 100 generating the results of plot 800 includes a 3×3 LED array. The parameters of display apparatus 100 discussed with respect to FIG. 8 are exemplary, and other embodiments may different values. Curve 810 shows relative luminance angular distribution in a display apparatus 100 without first reflective structure 104. Curves 802-808 demonstrate the effect on relative luminance of including first reflective structure 104 in display apparatus 100. Curves 802-808 also show the effect of changing one or more parameters of first reflective structure 104. Curves 802-808 include varying angles 512 ("angle"), radii of the top perimeter 604 ("t_Rad"), and heights 506 ("Height"). In various embodiments, the radii of the bottom perimeter 602 may also be changed. Display apparatus 100 generating the results of plot 800 included a radius of the bottom perimeter 602 equal to 1.5 mm. Parameters of first reflective structure 104 may be chosen in light of constraints on the size of the display system and/or to optimize the angular distribution for particular LCD input requirements. The inclusion of first reflective structure 104 in display apparatus 100 results in an increase in relative luminance (regardless of the values of the various parameters of structure 104) compared to display apparatus 100 without structure 104. The relative luminance advantageously increases without an increase in driving power of light source 106. Thus, there is an advantageous increase in illumination efficiency. Power may be advantageously reduced while maintaining similar relative luminance.

Curves 802-808 also demonstrate an advantageous reduction in the outgoing angle of light. Compared to curve 810, which shows at least a minimum relative luminance at measurement angles ±60°, curves 802-808 only register a minimum relative luminance around measurement angles ±55°. Moreover, whereas curve 810 shows a relatively flat relative luminance at all angles, curves 802-808 include peaks at smaller angles (i.e., more light has a smaller outgoing angle). The outgoing angles can be varied depending on the chosen cone design (e.g., angles 512, height 506, etc.) of first reflective structure 104; this is shown in the varying relative luminance values at varying measurement angles in curves 802-808. For example, curve 804 corresponds to structure 104 with the largest cone angles 512 of curves 802-808. Curve 804 shows a relatively large increase in relative luminance around measurement angles ±20°, whereas curves 802 and 806-808 experience large increases in relative luminance at larger measurement angles.

Display apparatus 100 (including first reflective structure 104 and/or second reflective structure 124) may be designed to optimize angular distribution and/or illumination efficiency. Angular distribution is a key factor for LCD performance. Angular distribution may be defined by the physical structure of the display apparatus. According to an exemplary embodiment, display apparatus 100 (including first reflective structure 104 and/or second reflective structure 124) may be advantageously designed for managing the outgoing angle distribution of light for certain types of LCDs, which are more sensitive to the angular distribution of incoming light.

Curves 802-808 show that balancing the parameters of first reflective structure 104 may advantageously result in optimizing angular distribution and increasing illumination efficiency. Different LCDs may have different angular distribution requirements on incoming illumination light. Cone angle 512, height 506, etc., of first reflective structure 104 can be designed to obtain the desired angular distribution. Curve 808 is associated with structure 104 with a relatively large angle 512 (53.1°) and relatively small height 506 (3.5 mm). Based on this relatively large angle, one would expect a relatively large increase in illumination efficiency. This is generally true, especially compared to curve 810. However, curve 802, which has structure 104 with a smaller angle 512 (43.6°) is shown to have greater relative luminance (at least for small measurement angles). This is because structure 104 associated with curve 802 has a relatively large height 506 (5 mm). In various embodiments, the parameters associated with first reflective structure 104 and/or second reflective structure 124 may be chosen to manage light rays to desired angles (e.g., outgoing angles and/or angles of incidence at display target 126) and angular distribution at display target 126.

Figure 9:
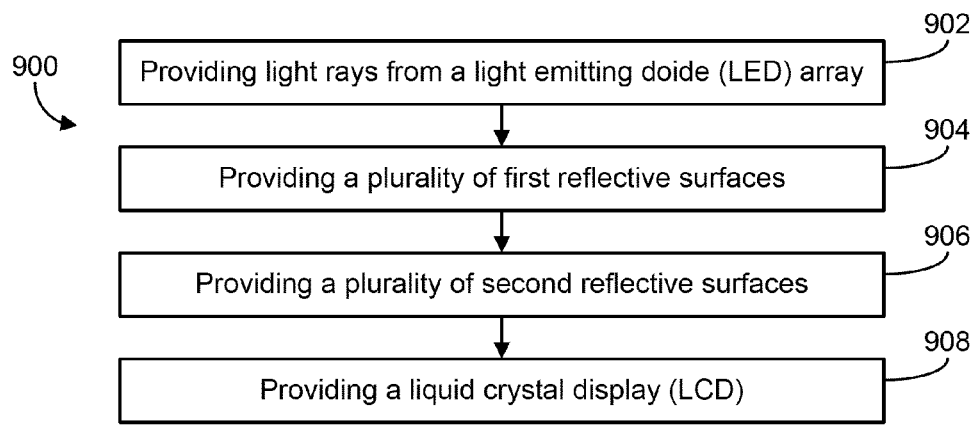
FIG. 9 is a flow diagram of a method for displaying an image, according to an exemplary embodiment.

Referring to FIG. 9, a flow diagram of a method 900 for displaying an image is shown, according to an exemplary embodiment. Method 900 may be implemented as a display system (e.g., helmet mounted display, LCD television, LCD monitor, etc.) A display system may include a processing circuit including a processor and a memory (e.g., a tangible computer-readable storage medium). The memory may include instructions to implement one or more processes described herein. The instructions may be executable by a processor. Method 900 includes providing light rays from a light emitting diode (LED) array (902). The LED array is a m×n matrix of LED lamps. The LED array may be substantially similar to light source 106 shown and described in FIGS. 1, 2, and 3A-3B. Method 900 includes providing a plurality of first reflective surfaces (904). The first reflective surfaces may be disposed between the LED array and the LCD. The first reflective surfaces may be adjacent to the LED array. The plurality of first reflective surfaces may reduce an outgoing angle of at least a portion of the light rays originating from the LED array. The first reflective surfaces may also translate at least a portion of the light rays toward the LCD. The first reflective surfaces may describe the reflective surfaces of first reflective structure 104. The first reflective surfaces may be substantially similar to interior surfaces 110 of first reflective structure 104 shown and described in FIGS. 1-2 and 4-6. Method 900 includes providing one or a plurality of second reflective surfaces (906). The second reflective surfaces may be disposed between the plurality of first reflective surfaces and the LCD. The plurality of second reflective surfaces may longitudinally translate at least a portion of the light rays from at least one of the LED array and the plurality of first reflective surfaces toward the LCD (e.g., across space 102 and/or cavity 112 of FIGS. 1-2). The second reflective surfaces may describe the reflective surfaces of second reflective structure 104. The second reflective structures may be substantially similar to the interior surfaces 116, 118, 120, and 122 of second reflective structure 124 shown and described in FIGS. 1-2. Method 900 includes providing a liquid crystal display (LCD) (908). The LCD may be configured to transmit a majority of the light rays from the LED array. The portion of light transmitted may be controlled by a current applied to the liquid crystals. The current may be provided by a voltage applied to the LCD. The portion of light rays transmitted may be representative of an image displayed by the LCD. The LCD may be substantially similar to display target 126 shown and described in FIGS. 1-2.

The systems and/or methods described herein may be advantageously implemented with many types of display systems (e.g., helmet-mounted displays, televisions, monitors, etc.). For example, multiple display apparatuses 100 may be combined to form a component of a helmet (e.g., a helmet used by an aircraft pilot), television, monitor, etc.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions, and arrangement of the exemplary embodiments without departing from the scope of the present disclosure.

Although the figures may show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps, and decision steps.

What is claimed is:

1. A display apparatus, comprising:
    a plurality of light sources, wherein each light source of the plurality of light sources corresponds to a recess of a plurality of recesses;
    a display target configured to receive light from the plurality of light sources, the display target displaying an image using a majority of the light received from the plurality of light sources;
    a first reflective structure configured to reflect and reduce an outgoing angle of at least a portion of the light from one light source of the plurality of light sources, wherein the first reflective structure comprises a bottom and a top surface, wherein the top surface is planar and has the plurality of recesses disposed therein, the plurality of recesses being separated from one another by a common interval, each recess of the plurality of recesses having an angled side wall defining a cone and being configured to receive one light source of the plurality of light sources, the plurality of recesses extending below the top surface through the first reflective structure to the bottom and configured to receive one light source of the plurality of light sources such that each light source fits into a corresponding respective recess, wherein the plurality of recesses comprise a first recess and a second recess, the first recess having an angled side wall defining a first cone having a first cone angle, the second recess having an angled side wall defining a second cone having a second cone angle, the first cone angle different from the second cone angle; and
    a second reflective structure configured to longitudinally translate at least a portion of the light from the plurality of light sources and the light reflected from the first reflective structure toward the display target, wherein the second reflective structure comprises a first peripheral wall and a second peripheral wall attached to the top surface of the first reflective structure, the first peripheral wall being spaced from the first recess along the top surface in a first direction and the second peripheral wall being spaced from the second recess along the top surface in a second direction opposite the first direction, the first peripheral wall and the second peripheral wall extending between a first opening for the first reflective structure and a second opening for the display target at an angle with respect to the top surface, wherein the second reflective structure comprises an enclosure having cross-sectional areas defined by at least the first peripheral wall and the second peripheral wall, wherein the cross-sectional areas uniformly increase across a longitudinal length of the second reflective structure such that the first opening has a smaller cross-sectional area than the second opening.

2. The display apparatus of claim 1, wherein each light source of the plurality of light sources comprise a light emitting diode (LED) and a corresponding base portion including electronics hardware to control emission of light from the LED, wherein the LED of a light source fits into one recess of the plurality of recesses, and wherein the base portion is directly coupled to an array structure of the plurality of light sources.

3. The display apparatus of claim 1, wherein the display target comprises a liquid crystal display (LCD).

4. The display apparatus of claim 1, wherein one recess of the plurality of recesses of the first reflective structure has a first radius at the bottom of approximately 1.5 mm and a second radius of 3.0 to 3.5 mm at the top surface.

5. The display apparatus of claim 4, wherein the first reflective structure is disposed in an adjacent position relative to a light source of the plurality of light sources, and wherein a height of the first reflective structure is about 4.5 mm.

6. The display apparatus of claim 1, wherein a cross-sectional area of a distal end of the first recess is greater than a cross-sectional area of a proximal end of the first recess.

7. The display apparatus of claim 4, wherein a shape of the plurality of recesses is at least partially one of conical, conic, polynomial-based, and cylindrical.

8. The display apparatus of claim 1, wherein (a) one light source of the plurality of light sources is disposed at a proximal end of the display apparatus; (b) the display target is disposed at a distal end of the display apparatus; (c) the first reflective structure is disposed in an intermediate position in the display apparatus relative to the one light source of the plurality of light sources and the display target; and (d) the second reflective structure is disposed in an intermediate position in the display apparatus relative to the first reflective structure and the display target.

9. The display apparatus of claim 1, wherein the first reflective structure and the second reflective structure comprise at least one of a reflective material and a reflective coating, and wherein the at least one of the reflective material and the reflective coating comprise a material configured to reflect only certain wavelengths of the light while not reflecting at least some wavelengths of the light.

10. The display apparatus of claim 9, wherein the reflective material or the reflective coating comprise at least one of a metal and a mirrored film.

11. A method for displaying an image, comprising:
providing light rays from a light emitting diode (LED) array, the LED array comprising an m×n matrix of LED lamps, wherein m is a number of rows and n is a number of columns;
providing a liquid crystal display (LCD) configured to transmit at least portion of the light rays from the LED array, the at least portion of the light rays transmitted being representative of an image displayed by the LCD;
providing a plurality of first reflective surfaces disposed between the LED array and the LCD, and adjacent to the LED array, the plurality of first reflective surfaces reducing an outgoing angle of at least a portion of the light rays originating from the LED array, wherein the first reflective surfaces are provided in respective recesses in a planar top surface of a first member, the respective recesses extending below the planar top surface through the first member to a bottom of the first member, each respective recess configured to receive one LED lamp of the LED array from the m×n matrix of LED lamps such that each LED lamp fits into a corresponding respective recess, the respective recesses being separated from one another by a common interval, wherein the respective recesses comprise a first recess and a second recess, the first recess having an angled side wall defining a first cone having a first cone angle, the second recess having an angled side wall defining a second cone having a second cone angle, the first cone angle different from the second cone angle; and
providing a plurality of second reflective surfaces disposed between a first opening of an enclosure for the plurality of first reflective surfaces and a second opening of the enclosure for the LCD, the plurality of second reflective surfaces longitudinally translating at least a portion of the light rays from at least one LED lamp of the LED array and the plurality of first reflective surfaces toward the LCD, wherein the plurality of second reflective surfaces are attached to the planar top surface and extend from the planar top surface at an angle with respect to the planar top surface, wherein the plurality of second reflective surfaces comprise the enclosure, the enclosure having cross-sectional areas defined by at least the plurality of second reflective surfaces, and wherein the cross-sectional areas uniformly increase across a longitudinal length of the plurality of second reflective surfaces such that the first opening of the enclosure has a smaller cross-sectional area than the second opening of the enclosure.

12. The method of claim 11, wherein at least one LED lamp of the LED array is received at a proximal end of a recess.

13. The method of claim 11, wherein providing the plurality of second reflective surfaces comprises providing the enclosure at least partially surrounding a longitudinal cavity, wherein a proximal end of the enclosure and a distal end of the enclosure are open, and wherein interior surfaces of the enclosure form the plurality of second reflective surfaces.

14. The method of claim 11, wherein the plurality of first reflective surfaces and the plurality of second reflective surfaces comprise at least one of a reflective material and a reflective coating.

15. A display system, comprising:
multiple light emitting diode (LED) arrays, the LED arrays emitting light rays, wherein the LED arrays comprise an m×n matrix of LED lamps, wherein m is a number of rows and n is a number of columns;
a liquid crystal display (LCD) configured to transmit at least a portion of the light rays from the LED arrays, the portion of light rays transmitted being representative of an image displayed by the LCD;
a plurality of first reflective surfaces disposed between a first opening of an enclosure for the LED arrays and a second opening of the enclosure for the LCD, and adjacent to the LED arrays, the plurality of first reflective surfaces reducing an outgoing angle of at least a portion of the light rays originating from the LED arrays, wherein the plurality of first reflective surfaces are provided in respective recesses in a planar top surface of a first member, the respective recesses extending below the planar top surface through the first member to a bottom of the first member, each respective recess configured to receive one LED lamp of the LED arrays from the m×n matrix of LED lamps such that each LED lamp fits into a corresponding respective recess, the respective recesses being separated from one another by a common interval, wherein the respective recesses comprise a first recess and a second recess, the first recess having an angled side wall defining a first cone having a first cone angle, the second recess having an angled side wall defining a second cone having a second cone angle, the first cone angle different from the second cone angle; and
a plurality of second reflective surfaces disposed between the plurality of first reflective surfaces and the LCD, the plurality of second reflective surfaces longitudinally translating at least a portion of the light rays from at least one of (a) one LED lamp of one LED array of the LED arrays and (b) the plurality of first reflective surfaces toward the LCD, wherein the plurality of second reflective surfaces are attached to the planar top surface and extend from the planar top surface at an angle with respect to the planar top surface, wherein the plurality of second reflective surfaces comprise the enclosure, the enclosure having cross-sectional areas defined by at least the plurality of second reflective surfaces, and wherein the cross-sectional areas uniformly increase across a longitudinal length of the plurality of second reflective surfaces such that the first opening of the enclosure has a smaller cross-sectional area than the second opening of the enclosure.

16. The display system of claim 15, wherein at least one LED lamp of the LED arrays is received at a proximal end of a recess.

17. The display system of claim 15, wherein the plurality of second reflective surfaces comprises multiple enclosures at least partially surrounding longitudinal cavities, wherein proximal ends of the multiple enclosures and distal ends of the multiple enclosures are open, and wherein interior surfaces of the multiple enclosures form the plurality of second reflective surfaces.

18. The display system of claim 15, wherein the plurality of first reflective surfaces and the plurality of second reflective surfaces comprise at least one of a reflective material and a reflective coating.

19. The display system of claim 15, wherein the display system is a component of a helmet.

20. The display system of claim 15, wherein the display system is a component of at least one of a television and a monitor.

\* \* \* \* \*